United States Patent [19]
Barry

[11] Patent Number: 5,458,441
[45] Date of Patent: Oct. 17, 1995

[54] PIPE SECTION FOR INSTALLATION INTO A SUBSEA PIPELINE

[75] Inventor: Donald W. Barry, Conroe, Tex.

[73] Assignee: Shell Oil Company, Houston, Tex.

[21] Appl. No.: 327,128

[22] Filed: Oct. 21, 1994

Related U.S. Application Data

[63] Continuation of Ser. No. 690,029, Apr. 23, 1991, abandoned.

[51] Int. Cl.$^6$ ...................................................... F16L 1/12
[52] U.S. Cl. ........................ 405/170; 405/158; 138/107; 138/155; 138/177
[58] Field of Search .................................. 405/156–158, 405/166, 167, 169, 170, 173; 138/106, 107, 109, 155, 172, 177

[56] References Cited

U.S. PATENT DOCUMENTS

| | | | |
|---|---|---|---|
| 25,151 | 8/1859 | Turney | 405/158 |
| 3,233,314 | 2/1966 | Watkins et al. | 405/158 |
| 3,434,295 | 3/1969 | Manning | 405/170 |
| 3,844,129 | 10/1974 | Finlay | 405/166 |
| 4,044,091 | 8/1977 | Hurst | 405/158 X |
| 4,335,752 | 6/1982 | Sumner | 405/156 X |
| 4,877,354 | 10/1989 | Williamson | 405/157 |

FOREIGN PATENT DOCUMENTS

| | | | |
|---|---|---|---|
| 601422 | 4/1978 | U.S.S.R. | 405/158 |
| 1383527 | 2/1975 | United Kingdom | 405/158 |
| 2015115 | 9/1979 | United Kingdom | 405/158 |

OTHER PUBLICATIONS

"Deepwater Pipeline Repair Methods" by R. R. Ayers, Introduction and Summary, Shell Development Co., Nov. 10, 1988.

"Deepwater Pipeline Repair Methods, Method Summaries" by C. G. Langner, Proposal Presentation Mtg., Nov. 10, 1988, Shell Dev. Co.

"Deepwater Pipeline Repair Methods, Recent Test Experience" by F. Proposal Presentation Mtg., Nov. 10, 1988, Shell Development Co.

"Diverless Buckle Recovery System for Shell 12" Bullwinkle Pipeline Installation, F. Kopp, R. K. Jeffries, 8th Intnl Conf. Mar. 1989.

Agreement Between Shell Development Co. & Participating Companies for Research Program on Deepwater Pipeline Repair Methods, Dec. 6, 1988.

"Deepwater Pipeline Repair Methods", vol. 1, Shell Development Co. Houston, Tex. Jan., 1990.

"Second Generation Diverless Buckle Recovery Tools for Shell's 12" Bullwinkle Gas Pipeline Installation, Apr. 23–24, API Conf.

"Cast–On Zinc Anodes", by J. G. Davis, Pipeline & Gas Journal, Feb. 1987, pp. 14–16.

Appendix I, Statement of Work, from Deepwater Pipeline Repair Methods, pp. 5–7, plus "Task List", p. 1.

*Primary Examiner*—John A. Ricci
*Attorney, Agent, or Firm*—Mark A. Smith

[57] ABSTRACT

An improved pipe section is disclosed for installation into a subsea pipeline. A pipe section in accordance with the present invention provides a length of pipe having a pipe wall and at least a first bearing shoulder projecting circumferentially outward from the pipe wall whereby the pipe section may be handled by supporting the pipe section from the first bearing shoulder during installation. The first bearing shoulder also prevents propagation of buckling failure in the subsea pipeline constructed from such pipe sections and the first bearing shoulder remains available for pipeline retrieval operations in the event of localized failure in the subsea pipeline.

17 Claims, 2 Drawing Sheets

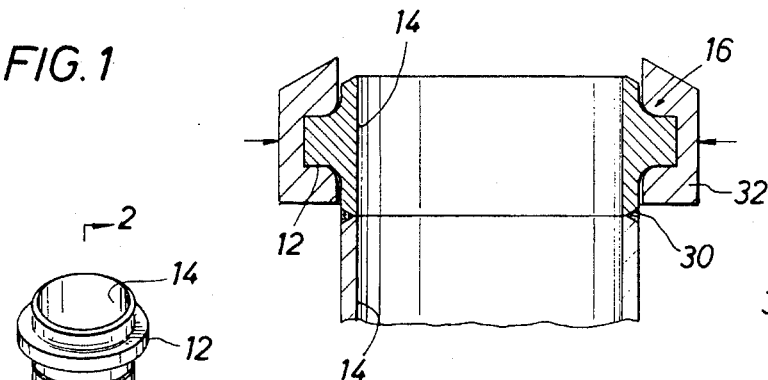
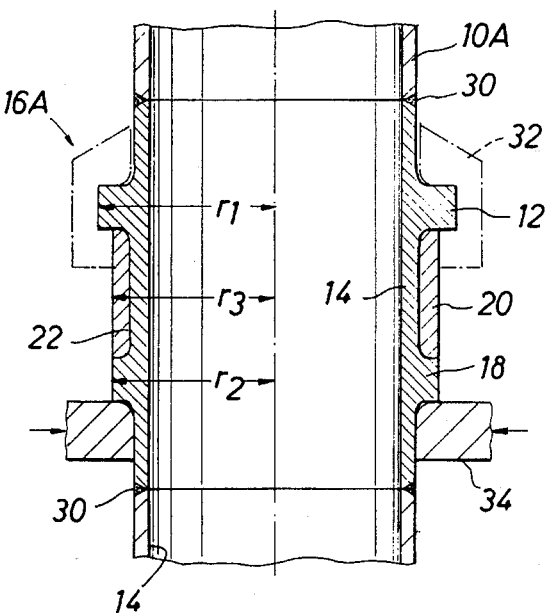
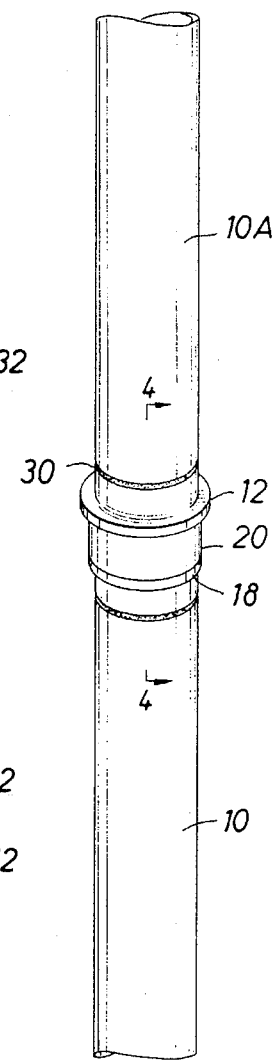
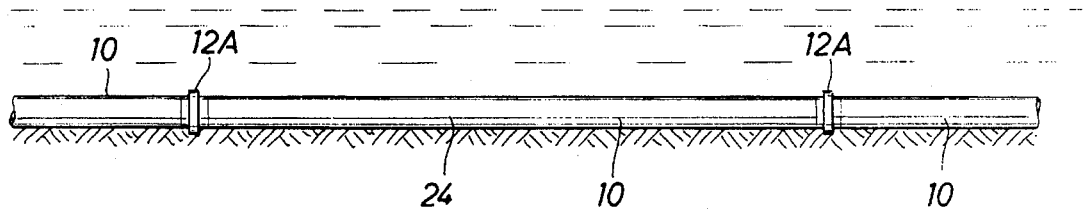

PIPE SECTION FOR INSTALLATION INTO A SUBSEA PIPELINE

This is a continuation of application Ser. No. 07/690,029, filed Apr. 23, 1991, now abandoned.

BACKGROUND OF THE INVENTION

This invention relates to a method and apparatus for structurally enhancing pipe sections and facilitating their handling and, more particularly, this invention relates to a method and apparatus to facilitate the installation, operation and maintenance of deepwater offshore pipelines.

Effective installation and operation of deepwater subsea pipelines are increasingly necessary as the need for new sources of oil and gas push development into deeper water offshore. These deepwater applications present several problems to the installation and operation of pipelines which are not significantly encountered in the more shallow developments of the past.

First, pipe laying operations are complicated with the increased water depth. Pipeline is laid from a barge, work boat or other especially equipped vessel to add new sections of pipe, one at a time, to the end of the pipeline, lowering the pipeline to the seafloor and advancing the vessel as new sections are added. The "S" lay technique in which additional sections are joined to the pipeline on a horizontal work deck, axially rolled down a shallow angle stinger and settled to the ocean floor in a long S-shaped curve, is not appropriate for deeper water.

The deepwater applications are best served by a vertical or near vertical joining operation which feeds additional pipe sections which leaves the pipelay vessel in a substantially vertical orientation, carrying this orientation down to proximity with the ocean floor where it curves to follow the contours of the seafloor.

One problem is that the end of the pipeline must be secured at the pipelay vessel in its substantially vertical orientation against the vertical load exerted by the weight of the pipeline. Before each new section of pipe is added, the last previous section joined is allowed to slip downward, below the pipelay vessel, until the top of the pipeline is in position for adding the next section. Then, it must be secured and any slip may cause the end of the pipeline to advance below the securing facilities of the vessel, thereby losing the end of the pipe which then falls to the ocean floor. This is likely to severely damage the pipeline and any recovery, if possible at all, would prove expensive, difficult and time consuming, particularly under the prior art. Thus, secure retention of the upper end of the pipeline is a critical issue to deepwater pipelaying operations. However, present methods of addressing this are inadequate to meet the needs in deepwater applications. For instance, tensioners which are used to advance the pipeline operate by securing the pipeline with skin friction and are poorly suited for use in vertical oriented pipelines. The free end of the tensioner is exposed at too high an elevation for convenient joining operations due to the length of the tensioner necessary to achieve sufficient skin friction to secure the pipe.

Alternatively, clamps which tightly "bite" into the surface of the pipe are inappropriate because such operations destroy at least the protective coating on the pipe, and may structurally damage the pipeline directly. In fact, present handling techniques are not even well suited to vertically orienting individual sections of pipe for joining to the vertical end of the pipeline.

Another problem of laying pipeline in deep water is the danger of buckling the pipe and the likelihood of propagating this failure, once initiated, along the length of pipeline. Damage to the pipeline during installation or later from falling debris can leave stress concentrations susceptible to buckling failure. Even the suspension of the pipeline across bottom irregularities such as ridges or valleys on the ocean floor can produce additional loads on the pipeline rendering it susceptible to buckling, particularly if there is a pressure loss within a high pressure gas pipeline designed in light of an internal pressure to offset some portion of the intense pressure of the ocean depths. Once buckling has initiated, the edge of the buckled region becomes a moving wave of stress concentration as the edge of the buckled, flattened region goes out of round and becomes less efficient in distributing the force of the great water pressure and the resistance of the pipeline plummets once the yield point has been crossed.

Finally, when there is any accident or damage to the pipeline it is very difficult to retrieve any portion of the pipeline to the surface for repairs. Repairs are very difficult to effect at the ocean floor in deepwater tracks of the pipeline.

SUMMARY OF THE INVENTION

It is an object of the present invention to provide a means to facilitate handling pipe sections during deepwater pipelay operations.

It is a further object of the present invention to provide a means to facilitate handling of the loose end of the pipeline during deepwater pipelay operations.

Another object of the present invention is to conveniently provide a buckle arrestor at frequent intervals along the length of a pipeline.

Toward the fulfillment of these and other objects, an improved pipe section for installation into a subsea pipeline made in accordance with the present invention will provide a length of pipe having a pipe wall and a first bearing shoulder projecting circumferentially outward from the pipe wall whereby the pipe section may be handled by supporting the pipe section from the bearing shoulder during installation, the first bearing shoulder preventing propagation of buckling failure in the subsea pipeline constructed from such pipe sections, and the first bearing shoulder being available for pipeline retrieval operations in the event of localized failure in the subsea pipeline.

BRIEF DESCRIPTION OF THE DRAWINGS

The brief description above, as well as further objects, features and advantages of the present invention will be more fully appreciated by reference to the following detailed description of the preferred embodiments which should be read in conjunction with the accompanying drawings in which:

FIG. 1 is a perspective view of a length of pipe having a first bearing shoulder in accordance with the present invention;

FIG. 2 is a cross sectional view of an end fitting suitable for use in fabrication of a pipe section in accordance with FIG. 1 and to which a travelling support has been schematically illustrated;

FIG. 3 is a perspective view of an alternate embodiment of improved, joined, pipe sections constructed in accordance with the present invention;

FIG. 4 is a cross sectional view of an end fitting suitable for fabrication of a pipe section in accordance with FIG. 3 and to which travelling and pipeline supports have been schematically added;

FIG. 5 is a side elevation view of a pipeline constructed from improved pipe sections in accordance with the present invention;

DESCRIPTION OF THE PROFFERED EMBODIMENTS

Figure 6A:
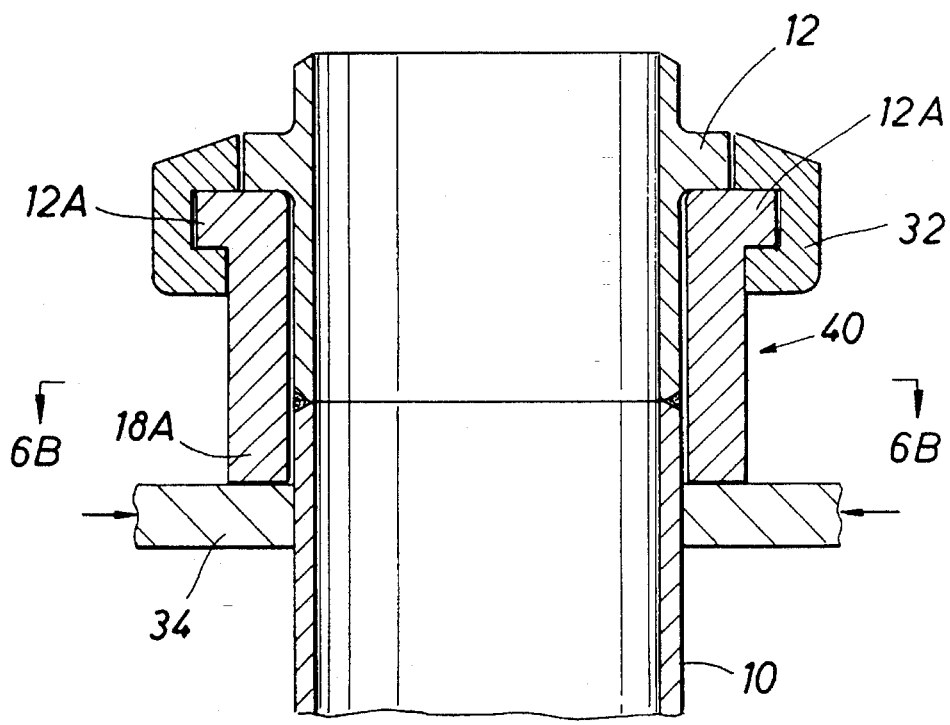
FIG. 6A is a cross-sectional view of a split collar system for temporarily providing a second bearing shoulder to a pipe section in accordance with the present invention having only a first bearing shoulder.

FIG. 1 illustrates an improved pipe section 10 in accordance with the present invention suitable for installation in a subsea pipeline and having a first bearing shoulder 12 projecting circumferentially outward from a pipe wall 14. First bearing shoulder 12 is mounted into the pipe section in such a manner that it may securely support the weight of the pipe section and of the trailing pipeline during installation operations.

FIG. 2 illustrates a preferred manner of providing first bearing shoulder 12 in an end fitting 16. The end fitting can be forged separately to establish first bearing shoulder 12 and then butt welded at weld 30 in onshore operations at the top of pipe section 10 to form the improved pipe section of FIG. 1. Pre-formed in this manner, the first bearing shoulder at the top of each pipe section to be laid in the deepwater interval of subsea pipeline facilitates handling of each section of pipe during installation. As discussed above, deepwater pipelines are best laid as fed from a vertical orientation from a lay vessel. The first bearing shoulder provides a secure support to safely grasp a pipe section in a travelling support 32 for up-ending into a vertical orientation. After a pipe section has been connected to the vertically disposed end of the pipeline such as by butt weld 30 (See FIG. 3), what was formerly the end of the pipeline is allowed to pass off the lay vessel as the travelling support 32, grasping the top of the pipe section at first bearing shoulder 12, lowers the newly added section to a pipeline support 34 at deck level on the lay vessel. See the alternate embodiment of FIG. 4. The travelling support 32 transfers the load to the pipeline support and is released to repeat the operations with a new section of pipeline. Transfer operations are facilitated where each pipe section presents a single bearing shoulder as in FIGS. 1 and 2 by using spaced apart gripping fingers on the travelling support which are offset with respect to gripping fingers on the pipeline support. Thus, the pipeline is securely supported by the first bearing shoulder in the pipeline support, the travelling support can be released to position another pipe section and the process can be repeated.

Alternatively, another bearing shoulder may be added to pipe section 10 as illustrated in FIGS. 3 and 4. The travelling support may then grasp the top of pipe section 10A at a first bearing shoulder 12. For convenience, the top of pipe section 10A has been deleted from each of FIGS. 3 and 4, but the position at which travelling support 32 grasps a first bearing shoulder has been illustrated in dotted outline in FIG. 4. The pipeline support 34 may securely hold the end of the pipeline at a second bearing support 18, also projecting circumferentially outward from cylindrical wall or pipe wall 14. FIGS. 3 and 4 illustrate joined pipe sections 10 and 10A ready for lowering. This will present the end fitting of pipe 10A at pipeline support 34 while still supported by travelling support 32, demonstrating the convenience of having first and second bearing shoulders 12 and 18 at the top of each pipe section.

The first and second bearing shoulders may also be conveniently provided in an end fitting 16A, see FIG. 4. FIG. 4 also illustrates another feature of this alternate embodiment which conveniently provides cathodic protection for the subsea pipeline after installation. A sacrificial anode bracelet 20 formed from zinc, aluminum, or other galvanically active metal or alloy, may be attached and electronically bonded to end fitting 16A about pipe wall 14 in the space between axially separated first and second bearing shoulders 12 and 18, respectively, here designated anode seat 22. The anode bracelet may be either cast in place or bolted around pipe wall 14 within anode seat 22.

Several additional benefits may be obtained by providing first bearing shoulder 12 with an outside radius $r_1$ greater than the outside radius $r_2$ of second bearing shoulder 18 and with the outer radius $r_3$ of anode bracelet 20 not being substantially greater than radius $R_2$. Thus, the anode bracelet, being of a relatively soft material, serves to protect pipe wall 14 during attachment of the travelling support without interfering with access to projecting first bearing shoulder 12. Further, second bearing shoulders 18 protect the anode from being axially stripped off or displaced during pipelay operations.

Figure 6B:
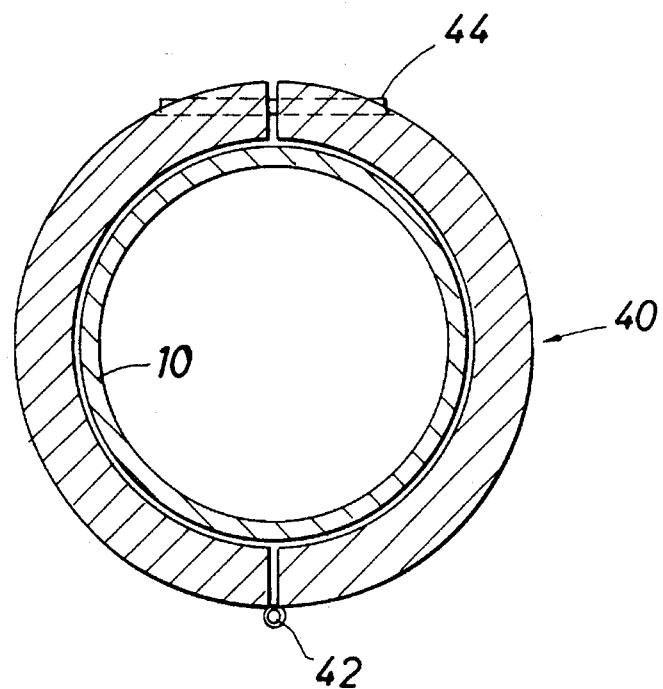
FIG. 6B is a cross sectional view of the collar system of FIG. 6A taken along line 6B—6B in FIG. 6A.

Some of the ease of handling discussed above for a pipe section having first and second bearing shoulders may be provided to a pipe section having only a first bearing shoulder by temporary use of a collar 40. See FIGS. 6A and 6B.

Collar 40 closes on hinge 42 about pipe section 10 in a position to bearingly engage first bearing shoulder 12 and the collar is secured with latching means 44. Collar 40 presents a removable first bearing shoulder 12A suitable for engagement by a travelling support 32 and the base of collar 40 provides a removable second bearing shoulder 18 suitable for secure engagement with pipeline supports 34. The collar is removed for re-use when joining of a pipe section 10 is complete and the section is supported by its newly joined section and lowered from the lay vessel.

FIG. 5 illustrates a subsea pipeline 24 constructed of improved pipe sections 10 in accordance with the present invention. First bearing shoulder 12 (as well as second bearing shoulder 18, where present) are conveniently provided at regular, closely spaced intervals along the length of pipeline 24. This by-product of providing improved handling during installation provides additional advantages to the operating pipeline.

First, the bearing shoulders 12 provide effective buckle arrestors 12A. The hoop strength of these structural elements protect the dimensional integrity of the pipeline in at least one point in each section of pipe, thereby preventing the propagation of any buckling failure that is initiated. Further, due to the relative strength and mass of these members, this protection remains considerable even if the pipe coating on the bearing shoulders is damaged in pipe handling operations. Thus, pipeline failure is limited to a localized event.

The second advantage of the present invention for the operation of subsea pipelines, once installed, is that if a localized failure does occur, the pipeline is provided with a nearby bearing shoulder 12 to facilitate retrieval for repair. In such an instance, the pipeline would be severed immediately adjacent a bearing shoulder and a tool would be lowered to fit over the end of the pipeline and engage about the bearing shoulder. The tool and pipeline would then be retrieved to the surface to effect repairs.

Other modifications, changes and substitutions are intended in the foregoing disclosure and in some instances, some features of the invention will be employed without a corresponding use of other features. Accordingly, it is appropriate that the appended claims be construed broadly and in a manner consistent with the spirit and scope of the invention herein.

What is claimed is:

1. An improved pipe section for installation into a welded subsea pipeline, comprising:

a length of pipe having a pipe wall; and a first bearing shoulder circumferentially projecting outwardly from the pipe wall, the first bearing shoulder having an outer radius $r_1$; and a second bearing shoulder circumferentially projecting outwardly from the pipe wall, said second bearing shoulder being axially displaced from the first bearing shoulder and having an outer radius $r_2$, wherein radius $r_1$ is greater than $r_2$;

whereby the pipe section may be handled in a substantially vertical axial orientation by supporting the pipe section from the first bearing shoulder during installation, the first bearing shoulder prevents propagation of buckling failure in the subsea pipeline constructed from such pipe sections, and the first bearing shoulder is available for pipeline retrieval operations in the event of localized failure in the subsea pipeline.

2. An improved pipe section in accordance with claim 1, further comprising;

an anode seat circumferentially defined about the pipe wall between the first and second bearing surfaces; and an anode bracelet set within the anode seat and having an outer radius not substantially greater than radius $r_2$.

3. An improved pipe section in accordance with claim 2 wherein the first and second bearing shoulders project from an end fitting butt welded into the pipe section.

4. An improved pipe section for installation into a subsea pipeline comprising:

a length of pipe having a pipe wall;

a first bearing shoulder circumferentially projecting outwardly from the pipe wall adjacent, but spaced from, an end of the length of pipe; and a second bearing shoulder projecting circumferentially outward from the pipe wall on the same end of the pipe length and adjacent, but spaced axially away from the first bearing shoulder.

5. An improved pipe section in accordance with claim 4 wherein the first bearing shoulder has an outer radius of $r_1$, the second bearing surface has an outer radius $r_2$, and radius $r_1$ is greater then $r_2$.

6. An improved pipe section in accordance with claim 4, further comprising:

an anode seat circumferentially defined about the pipe wall between the first and second bearing shoulders; and an anode bracelet set within the anode seat.

7. An improved pipe section for installation into a subsea pipeline, comprising:

a length of pipe having a pipe wall;

a first bearing shoulder circumferentially projecting outwardly from the pipe wall adjacent, but spaced from, an end of the length of pipe;

a second bearing shoulder projecting circumferentially outward from the pipe wall on the same end of the pipe length and adjacent, but spaced axially away from the first bearing shoulder;

an anode seat circumferentially defined about the pipe wall between the adjacent first and second bearing surfaces; and an anode bracelet set within the anode seat and protected from axial shear loads by the first and second bearing surfaces.

8. An improved pipe section in accordance with claim 7 wherein the first bearing shoulder has an outer radius $r_1$, the second bearing shoulder has an outer radius of $r_2$, the anode bracelet has an outside radius of $r_3$ and the following relations are satisfied:

radius $r_1$ is greater than radius $r_2$; and radius $r_3$ is less than or equal to radius $r_2$.

9. An end fitting for connection to a section of pipe for installation into a subsea pipeline, said end fitting comprising:

a cylindrical wall suitable for connection into the section of pipe;

a first bearing shoulder projecting circumferentially outward from the cylindrical wall and having an outer radius $r_1$;

a second bearing shoulder projecting circumferentially outward from the cylindrical wall, said second bearing shoulder being axially separated from the first bearing shoulder and having an outside radius of $r_2$ such that radius $r_1$ is greater than radius $r_2$;

an anode seat circumferentially defined about the cylindrical wall between the first and second bearing shoulders;

an anode bracelet set within the anode seat and having an outer radius $r_3$ not substantially greater than $r_2$.

10. A method for providing a series of buckle arrestors in a subsea pipeline, comprising:

fabricating end fittings having at least a first bearing shoulder;

permanently joining the end fitting into the pipe section;

using the first bearing shoulder for supporting the pipe section in substantially vertical pipelay operations on a pipelay vessel offshore; and laying the pipeline from the pipelay vessel.

11. An improved pipe section for installation into a subsea pipeline, comprising:

a length of pipe having a pipe wall;

a first bearing shoulder circumferentially projecting outwardly from the pipe wall adjacent, but spaced from, an end of the length of pipe; and a second bearing shoulder projecting circumferentially outward form the pipe wall adjacent, but spaced axially away from the first bearing shoulder;

wherein the first bearing shoulder has an outer radius of $r_1$, the second bearing surface has an outer radius $r_2$, and radius $r_1$ is greater than $r_2$.

12. An improved pipe section for installation into a subsea pipeline, comprising:

a length of pipe having a pipe wall;

a first bearing shoulder circumferentially projecting outwardly from the pipe wall adjacent, but spaced from, an end of the length of pipe;

a second bearing shoulder projecting circumferentially outward from the pipe wall adjacent, but spaced axially away from the first bearing shoulder;

an anode seat circumferentially defined about the pipe wall between the first and second bearing surfaces; and an anode bracelet set within the anode seat;

wherein the first bearing shoulder has an outer radius $r_1$, the second bearing shoulder has an outer radius of $r_2$, the anode bracelet has an outside radius of $r_3$ and the following relations are satisfied:

radius $r_1$ is greater than radius $r_2$; and radius $r_3$ is less than or equal to radius $r_2$.

13. A method for sequentially adding a plurality of pipe sections into a trailing pipeline in laying a subsea pipeline, comprising:

supporting the trailing pipeline from a pipelay vessel using a first bearing shoulder of one of the pipe sections during substantially vertical pipelay operations from the pipelay vessel offshore;

butt welding an additional of the pipe sections to the pipe section supporting the trailing pipeline, joining this additional pipe section in a substantially vertical orientation presenting a first bearing shoulder of the additional pipe section at its top end; and passing the pipe section that had been supporting the trailing pipeline downward from the pipelay vessel and supporting the trailing pipeline with the first bearing shoulder of the additional pipe section.

14. A method for adding pipe sections in laying a subsea pipeline in accordance with claim 13 wherein supporting a trailing pipeline from a pipelay vessel using the first bearing shoulder comprises securing the first bearing shoulder in a pipeline support and wherein passing the pipe section that had been supporting the trailing pipeline downward from the pipelay vessel further comprises securing the first bearing shoulder of the additional pipe section in a travelling support, releasing the pipeline support, lowering the additional pipe section with the traveling support, securing the first bearing shoulder of the additional pipe section in the pipeline support, and releasing the traveling support.

15. A method for adding pipe section in laying a subsea pipeline comprising:

supporting a trailing pipeline from a pipelay vessel using a second bearing shoulder of a last joined pipe section substantially vertically in a pipeline support on a pipelay vessel;

bringing an added pipe section into position endwise adjacent and immediately over the last joined pipe section with a travelling support engaging a first bearing shoulder presented on the added pipe section;

joining the added pipe section to the last joined pipe section; and passing the last joined pipeline section that had been supporting the trailing pipeline downward from the pipelay vessel comprising:

releasing the pipeline support from the second bearing shoulder of last joined pipe section;

lowering the last joined pipe section with the trailing pipeline supported at the first bearing shoulder of the added pipe section as engaged with the traveling support;

securing a second bearing shoulder of the added pipe section in the pipeline support; and releasing the traveling support from the first bearing shoulder of the added pipe section.

16. A method for adding pipe sections in laying a subsea pipeline in accordance with claim 15, wherein the first bearing shoulder of the added pipe section has an outer radius $r_1$ and the second bearing shoulder on the added pipe section is provided adjacent, but spaced apart from, the first bearing shoulder, said second bearing shoulder having an outer radius $r_2$, wherein radius $r_1$ is greater than radius $r_2$.

17. A method for adding pipe sections in laying a subsea pipeline in accordance with claim 16, further comprising:

providing cathodic protection for the subsea pipeline by providing an anode bracelet in an anode seat defined by the first and second bearing shoulders of the added pipe section, said anode having an outer radius $r_3$ which is less than radius $r_2$.

* * * * *